United States Patent [19]
Wornell

[11] Patent Number: 5,570,351
[45] Date of Patent: Oct. 29, 1996

[54] MULTI-USER COMMUNICATION SYSTEM EMPLOYING SPREAD SIGNATURES

[75] Inventor: Gregory W. Wornell, Wellesley, Mass.

[73] Assignee: Lucent Technologies Inc., Murray Hill, N.J.

[21] Appl. No.: 321,297

[22] Filed: Oct. 11, 1994

[51] Int. Cl.[6] .................................................. H04J 13/02
[52] U.S. Cl. ............................... 370/18; 455/33.1
[58] Field of Search ............................ 370/18, 95.1, 102; 375/200, 205, 206, 230, 231, 232, 208, 267; 371/37.1, 43; 455/33.1

[56] References Cited

U.S. PATENT DOCUMENTS

| | | | |
|---|---|---|---|
| 4,809,295 | 2/1989 | Zscheile, Jr. et al. | 375/208 |
| 4,901,307 | 2/1990 | Gilhousen et al. | 370/18 |
| 5,309,474 | 5/1994 | Gilhousen et al. | 375/206 |

OTHER PUBLICATIONS

Gregory W. Wornell "Spread-Signature CDMA: Efficient Multiuser Communication in the Presence of Fading" IEEE Transactions on Information Theory vol. 41, No. 5, Sep. 1995 pp. 1418–1438.

John G. Proakis, Digital Communications, 2nd ed., 1989, McGraw–Hill pp. 821–823, 800–807, 362–372, 377–380, 441–451, 728–738, 554–574, 593–602, and 454–459.

Armin Wittneben, IEEE Globecom, 1990, "An Energy–and Bandwidth–Efficient Data–Transmission System for Time-–Selective Fading Channels".

*Primary Examiner*—Douglas W. Olms
*Assistant Examiner*—Min Jung

[57] ABSTRACT

Transmitting and receiving method and apparatus especially suited to multi-user communication systems such as cellular systems, in which multi-path transmission encounters time-variable fading characteristics in the channel. Pre-coding message stream of symbols by convolution with predetermined signature sequences for respective users enables separation of respective user messages and combats effects of variable fading.

22 Claims, 2 Drawing Sheets

TRANSMITTER

RECEIVER

MULTI-USER COMMUNICATION SYSTEM EMPLOYING SPREAD SIGNATURES

BACKGROUND OF THE INVENTION

1. Field of the Invention

This invention relates to a method and apparatus for radio or wireless communication among multiple users. It is especially suitable for use in mobile communication systems wherein a single base station must simultaneously maintain communications with a plurality of mobile stations. Cellular radio is a prime example of such a communication system. The invention facilitates error-free communication over channels characterized by fading.

In addition to mobile radio communication systems, personal wireless systems, indoor wireless networks, and digital audio and television broadcasting systems are growing in importance. However, the rapidly escalating demand for such services and the increasingly-sophisticated nature thereof have put great pressure on the limited available bandwidth within the radio spectrum. Recognizing the constraints imposed by the limited available frequency spectrum, it is dear that the most efficient possible use must be made of the available frequency spectrum in order to achieve error-free transmission and reception of signals which are primarily processed in the discrete domain.

2. Description of the Prior Art

Especially in communication systems such as mobile radio, the channels between the transmitters and receivers are likely to have a multipath nature. Consequently, the channels are characterized by fading as well as by additive noise. Although the waveform which is actually transmitted over the channel is generally analog in nature, much of the signal processing within the transmitters and receivers can be accomplished in the discrete domain. Such digital signal processing enables certain coding and decoding steps to be taken in the transmitters and receivers respectively in order to minimize errors which would otherwise occur as a result of fading and noise in the channels. Various approaches have been taken in the combat against errors by means of coding and decoding in the transmitters and receivers respectively. One such approach is employed in code-division multiple-access ("CDMA") systems. A brief description of such systems appears on pages 821–823 of *Digital Communications*, a book by John G. Proakis, the second edition of which was published by McGraw-Hill Book Company in 1989. On those pages, Proakis incorporates into a CDMA system a disclosure which was made on pages 800–807 of the same reference. That disclosure relates to a communication system including a modulator which impresses onto the stream of symbols being prepared for transmission a binary-valued sequence which Proakis calls "pseudo-noise." The pseudo-noise is generated within the transmitter by a pattern generator especially designed for that purpose. The receiver in the system includes a demodulator in which pseudo-noise from a similar pattern generator, synchronized with the generator in the transmitter, is employed to separate the desired estimated signal from the pseudo-noise. The separated signal then proceeds through a channel decoder and is converted into the form desired at the output. Proakis does not specify the nature of the pseudo-noise other than to say that it is a binary-valued sequence. He says nothing whatever about the Length of the sequence relative to the interval between the symbols of the data stream.

SUMMARY OF THE INVENTION

The communication system of the present invention also modulates a sequence of symbols onto the stream of coded data symbols. And a similar sequence of symbols is employed in the receiver to demodulate the received estimated data stream. However, in accordance with the present invention, the duration of each such sequence is specified as being longer than the inter-symbol time interval of the data stream. Moreover, the present invention contemplates that each user of the communication system will have its own characteristic sequence to be impressed upon the data stream at the transmitter and removed therefrom at the receiver. Accordingly, the sequence generated and employed for this purpose will henceforth be referred to as a "signature." The signature should be pre-established for each user and should be fixed in duration. Importantly, such duration should exceed the inter-symbol time interval of the coded data stream. The time between initiation of transmission of a signature corresponding to one symbol and initiation of transmission of the signature corresponding to the next symbol should exceed the time spacing between initiation of those symbols in the coded data stream.

Although it is contemplated that each user will be assigned a single characteristic signature, it would be possible for a user to have more than one signature. However, no signature should be assigned to more than one user. In a multi-user system, in which a plurality of messages are transmitted over a channel sharing the same carrier frequency, it is only the characteristic signature of each user which enables its message to be separated from the respective messages of the other users of the system.

By employing signature sequences which are significantly longer than the interval between symbols of the data stream, the transmission of each such symbol of each user of the system is, in effect, spread over a wide temporal and spectral extent. In accordance with the invention, this spreading of the transmission is efficiently exploited to combat the effects of fading in the channel. In the following specification, a system in accordance with the present invention will be referred to as "spread-signature CDMA."

BRIEF DESCRIPTION OF THE DRAWINGS

The invention summarized above will be described in detail in the following specification. The specification will be best understood if read while referring to the accompanying drawings in which.

DETAILED DESCRIPTION OF THE PREFERRED MODE OF CARRYING OUT THIS INVENTION

Figure 1:
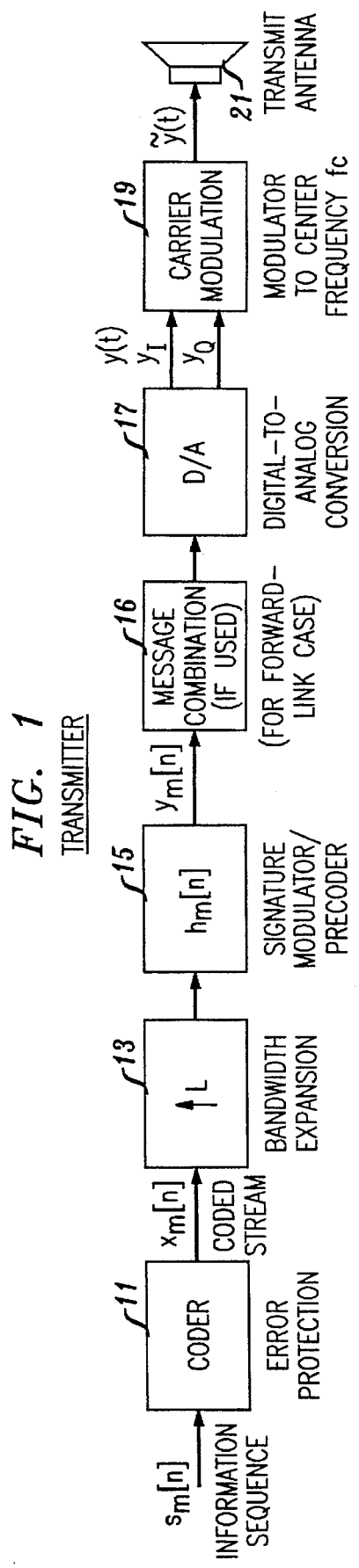
FIG. 1 is a block diagram or flow chart of a transmitter for use in the practice of this invention.

In reading the following description, it is important to bear in mind that the explanation of steps and apparatus is not confined to any particular configuration of use. Reference will be made to "a transmitter" and "a receiver." Those sub-assemblies could be located anywhere and could be part of almost any type of radio, wireless, or television system. However, the principles of the invention do have special applicability to mobile radio systems because of the multi-path transmissions and relative motions between transmitter and receiver which are characteristic of mobile communication systems. Accordingly, for convenience in identifying the "players" while elaborating upon the principles of the invention, it will be assumed that the environment is that of a mobile communication system. Therefore, the terminology of a "base station" and a plurality of "mobile stations" will be adopted.

The importance of this invention will be most fully appreciated if it is understood at the outset that the transmission channel of a communication system such as mobile radio is frequently characterized by a type of fading which is referred to in the art as "Rayleigh fading." The transmission channel is also characterized by a type of noise which is to sometimes called "Gaussian additive noise." The Rayleigh fading has a multiplicative or time-varying convolutional effect upon the transmitted signal, whereas the Gaussian noise may be regarded as having an additive effect. The Gaussian noise is easier to deal with than the Rayleigh fading. This invention is particularly directed to overcoming the deleterious effect of Rayleigh fading. Spread-signature CDMA converts various degradations of transmission, attributable to fading, co-channel interference, and receiver noise, into a single, more-benign form of noise. This form of noise, which is undesirable but which is comparatively easy to combat, may have the following characteristics: 1. It is uncorrelated. That is to say, the components of the noise do not interact with one another. 2. It is additive. Additive noise is to be contrasted with fading, which may be regarded as a multiplicative or time-varying convolutional effect. 3. It is "quasi-Gaussian." The amplitude distribution of the noise samples has the familiar Gaussian form.

As will be explained in the following paragraphs, the noise which is uncorrelated, additive, and quasi-Gaussian can be combatted relatively easily. Certain measures to overcome the effect of such additive noise are taken in the "coding" step of the method which is now to be described. As aforementioned, the effective measures against the multiplicative consequences of fading are taken in the so-called "pre-coding" step of the method in accordance with the invention. It is noteworthy that the precoding step chronologically follows the coding step in the sequence of operations performed upon the data stream. Such terminology results from the fact that the various processing steps are named from the viewpoint of the channel. Of course, the order in the receiver is reversed.

DETAILED CIRCUIT DESCRIPTION

In the few mathematical expressions that follow in this specification, parentheses are used to denote continuous-valued arguments; square brackets, on the other hand, are used to denote discrete-valued arguments, including digital quantities.

FIG. 1 of the drawings illustrates the transmitter of the spread-signature CDMA system. The input information, of course, may be derived from either an analog or a discrete source. However, FIG. 1 shows the input stream of symbols as an information sequence $s_m[n]$. The information sequence is first fed to a coder 11, which introduces redundancy into the information sequence. Such redundancy is useful in combating the effects of additive noise encountered by the transmitted waveform in passing over the channel. A disclosure and discussion of this type of coding appear on pages 362 through 366 of the book entitled *Digital Communications*, by John G. Proakis, the second edition of which was published by McGraw-Hill Book Company in 1989. Two leading types of coding which may be used for this purpose are block coding and convolutional coding. A discussion of block codes appears on pages 377–380 of the Proakis reference, while convolutional coding is described on pages 441–451 of the same reference. One variation of convolutional coding which is suitable for use in the practice of the present invention is the so-called "trellis coding," which is also described by Proakis. Such coding usually improves the performance of a communication system by minimizing the effect of additive noise on the transmitted signal. However, there may be occasions when, in the practice of the present invention, coding of this type is not required.

The coded symbol stream $x_m[n]$ is next upsampled in an expander 13 to increase its bandwidth. Such upsampling may be accomplished by inserting trivial symbols such as zeros between adjacent meaningful symbols of the coded stream. Referring to FIG. 1 of the drawings, the bandwidth-expansion parameter of expander 13 is designated as "L." The value of L should be equal to or greater than "M", the number of users of the system. This bandwidth-expansion step permits the communication system to achieve a given level of performance with less coding than would otherwise be required. However, bandwidth expansion can be employed only to the extent that sufficient bandwidth is available for that purpose. If available bandwidth is very limited, there may be instances in which the bandwidth-expansion step can be eliminated in favor of additional coding.

The coded stream, with or without bandwidth expansion as the case may be, then goes to a precoder/signature modulator 15 wherein one of the most important steps of the method is performed. Precoder/signature modulator 15 is so named because the names of the subsystems are chosen from the vantage point of the transmission channel.

Precoder/signature modulator 15 includes a generator for repetitively producing symbol sequences that are herein denominated "signature sequences." Each such signature sequence is assigned to a particular user of the communication system and identifies only that particular user. Each user may have more than one signature, but each signature should identify only a single, particular user.

Each signature sequence is combined, by a process of convolution, with the coded data stream representing the message to be sent to a particular user or by a particular user. In the case of the base station, as distinguished from the plurality of mobile stations, the coded data stream to be transmitted from the base station to a particular mobile station is modulated onto the signature sequence for that mobile station as the most important function of the precoder/signature modulator at the base station.

In addition to identifying the messages intended for particular users in a multi-user system, the precoding operation performed by the precoder/signature modulator is directed to reducing the effect of fading in the transmission channel. In this regard, the function of precoder/signature modulator 15 differs from that of coder 11, which has already been described. The primary purpose of coder 11 is to reduce the harmful effect of additive noise in the transmission channel.

Mathematically, the signature-modulated stream $y_m[n]$ for the mth user is constructed according to the following expression:

$$y_m[n] = \Sigma x_m[k] h_m[n-kL], \qquad \text{Equation (1)}$$

wherein k is a constant.

In Equation (1), $x_m[k]$ represents the particular portion of the coded data stream which is to be convolved with the signature sequence for the mth user. Once again, the square brackets in the expression indicate that the arguments are discrete in nature.

As noted, Equation (1) specifies the signature-modulated stream $y_m[n]$ for only the mth user. When the respective messages intended for all the users of the system are superposed, the output of the precoder/signature modulator may be expressed mathematically as follows:

$$y[n] = \sum_{m=1}^{M} \sum_{k} \times [kM + m - 1] h_m[n - kL] \quad \text{Equation (2)}$$

As indicated in Equation (2), the total output y[n] of precoder/signature modulator 15 is the summation of the respective signature-modulated streams $y_m[n]$ for each of the respective users of the system. The "kernel", or transfer function, of precoder/signature modulator $h_m[n]$ may be regarded as an active filter having M subfilters, one for each user. Again, L represents the bandwidth-expansion parameter if bandwidth expansion is used.

It is often convenient (but not necessary) to choose a signature sequence that is binary-valued. Moreover, it should have a fixed length which represents a time duration significantly longer than the inter-symbol spacing of the coded data stream. The length of the signature sequence may be designated by the letter "N." As the value of N is increased, the effectiveness of the signature sequence in overcoming fading in the channel will increase. However, increasing N increases the delay in the system, and there may be a limit on the amount of delay which can be tolerated in the system. Again, the inter-symbol spacing of the coded data stream is the time spacing between respective initiations of successive symbols of said coded data stream.

The convolution step executed by precoder/signature modulator 15 may be regarded as a series of multiplication steps between the appropriate signature sequence and a block of data symbols representing a message of the user who "owns" that particular signature sequence. Each time the coded data stream is shifted as it passes through the modulator, one new symbol becomes convolved, and one symbol drops out of the convolution process. Further, the products of the various multiplication steps are summed to produce $y_m[n]$. Then, in accordance with Equation (2), the various summations are themselves superposed to form y[n]. This superposition may be simply summarized as follows:

$$y[n] = \sum_m y_m[n]. \quad \text{Equation (3)}$$

The generation of the signature sequence, the modulation or convolution process, and the summation and superposition can all be accomplished in a programmable, general-purpose digital-signal-processor chip such as one from the Model TMS 320 series, available from Texas Instruments. Alternatively, a custom-designed, special-purpose chip may be used for this purpose.

The "superposed summation" is then converted from discrete to analog form in a digital-to-analog converter 17. The converter requires two synchronized channels: one for processing the real part of the sequence y[n], and the other for processing the imaginary part of this sequence. Thus, as shown in FIG. 1 of the drawings, the respective outputs of D/A converter 17 are the in-phase component, denoted $y_I(t)$, and the quadrature component of y(t), denoted as $y_Q(t)$. Thus, the sequence y[n] is converted into a continuous-time waveform y(t) at an appropriate rate and quantization. The choice of rate (i.e., the number of samples output per second) affects the bandwidth of the resulting system, while the degree of quantization (i.e., the number of bits used to represent each sample) affects the performance of the overall system. In any event, suitable D/A chips for this application are available from a wide range of commercial vendors; alternatively, custom-designed D/A chips may be used for this purpose.

The remainder of the processing at the transmitter is similar to that which is performed in other RF communication systems, and can be implemented in available analog circuitry. First, y(t) is modulated up to the desired carrier frequency by means of a carrier modulator or mixer 19. Specifically, the in-phase component $y_I(t)$ is multiplied by $\cos(2\Pi f_c t + \theta)$, while the quadrature component $y_Q(t)$ is multiplied by $\sin(2\Pi f_c t + \theta)$. It will be understood that $f_c$ is the desired center frequency for the RF transmission, while θ (theta) is an arbitrary phase. Both components are passed through amplifiers to achieve the desired transmission power level. The superposition of the two mixed components is then broadcast through a suitable RF antenna 21.

It may be useful to stress that the communication system in accordance with this invention contemplates two different types of transmission: (a) forward-link transmission from the base station to the mobile stations, and (b) reverse-link transmission from the respective mobile stations to the base station. In forward-link transmission, the signature-modulated sequences representing messages to the respective users, or mobile stations as the case may be, are "summed" or otherwise combined just prior to conversion by the digital-to-analog converter. All of those signature-modulated symbol streams are then prepared for transmission in a coordinated fashion to their respective intended recipients. Although all of the messages are combined for transmission by means of a single carrier wave, each message bears its own distinctive signature. Thus, at the receiver, the combined signal can be separated into its components whereby each user is able to isolate the message intended for it. As will be explained in further paragraphs, this requires synchronization between the various mobile stations and the base station. However, when the mobile user stations transmit messages back to the base station, there can be no coordination among the various reverse-link transmissions from the respective mobile stations to the base station. The transmitter at each mobile station will require a separate digital-to-analog converter, just as the base station needs to have such a converter.

Figure 2:
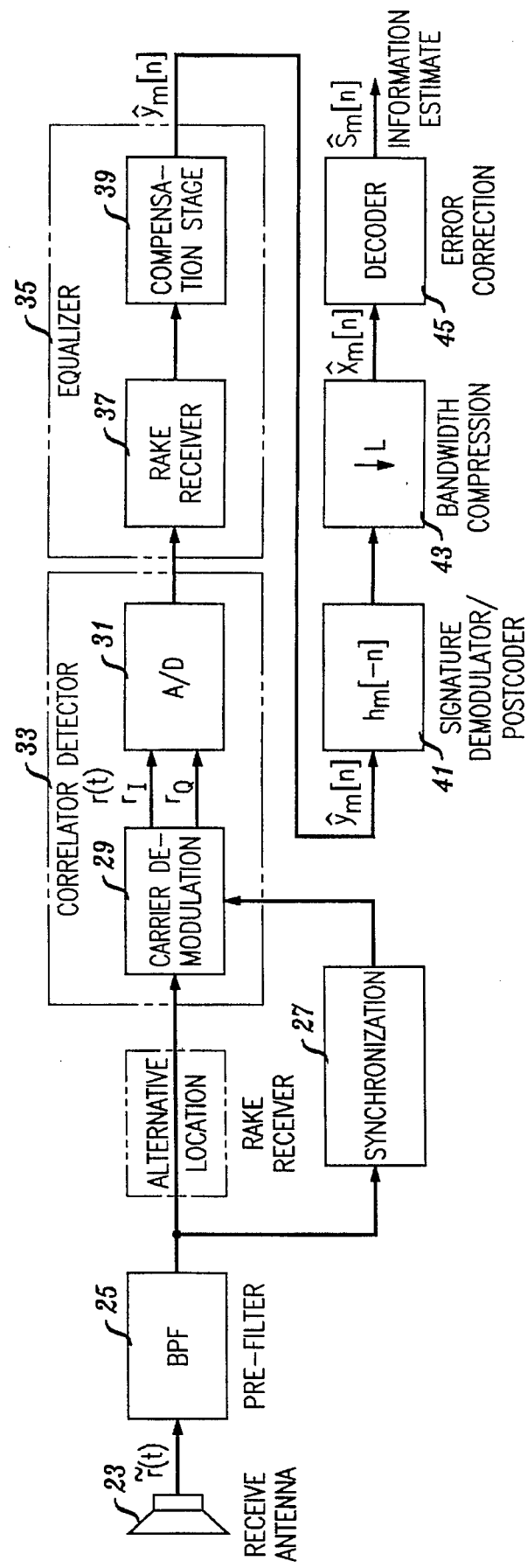
FIG. 2 is a block diagram or flow chart of a receiver for use in the practice of this invention.

Turning now to the steps to be performed at the receiver, whether that of the base station or any of the mobile stations, we refer to FIG. 2 of the drawings. The first stages of processing are similar to those performed in other RF communication systems. Although either coherent or non-coherent reception may be used, the following discussion will assume that the reception is coherent. The analog signal output of a receiving antenna 23 is first prefiltered by a bandpass filter 25 to eliminate out-of-band noise, i.e. noise outside the bandwidth used by the transmission. Next follows synchronization, by means of a locally-generated reproduction of the carrier wave having the same frequency as the carrier wave and a suitable phase. That wave is furnished by a local oscillator 27 to a carrier demodulator 29, which produces an analog output wave that has been translated in frequency down to the base band. Carrier demodulator 29 separates the in-phase and quadrature components of the received analog signal. Those components, $r_I(t)$ and $r_Q(t)$ respectively, are then simultaneously sampled at an appropriate rate by a two-channel analog-to-digital converter "(A/D)" 31. The two A/D output sequences are then combined as real and imaginary parts to form the complex-valued discrete sequence r[n]. The implementation of the carrier demodulation, sampling, and conversion to discrete form can be accomplished by means of a commercially-available correlator detector 33. The boundaries of correlator detector 33 are indicated by dash fines in FIG. 2 of the drawings.

The output of correlator detector 33, designated as "m[n]", then undergoes adaptive equalization, which is a process including at least two stages. Both stages of processing may be accomplished in a commercially-available equalizer 35. The input stage of the adaptive equalizer is most likely to be a "RAKE receiver" 37. The present discussion assumes that RAKE receiver 37 receives and processes the discrete signal m[n]. However, in some applications, it may be preferable to implement the RAKE receiver by means of analog circuitry operating on the prefiltered received analog signal r(t) prior to carrier demodulation and sampling. A suitable RAKE receiver is the discrete-time equivalent of that presented between pages 728 and 738 of the aforementioned book by John G. Proakis.

The second stage of adaptive equalization is a compensation stage. Examples of a compensator 39 suitable for employment in the practice of this invention are described between pages 554 and 574 of the Proakis book.

Although the use of the compensation stage of equalization is not critical, significant degradation in performance of the system might occur if that stage is omitted. However, in multi-user systems having large numbers of users, compensation may be unnecessary in the receiver of the base station.

Both stages of equalization depend upon measurements of fluctuations in the fading which characterizes the transmission channel. Those measurements may be obtained, for example, by using training-sequence or decision-feedback techniques as described between pages 593 and 602 of the Proakis book.

In order to provide a background for disclosure and discussion of the further steps of the method in accordance with the invention, it will be useful at this point to review the assumptions which have been tacitly made concerning the channel over which the signal is transmitted. A model of the channel would consist of two components, as follows: (a) A linear time-varying filter representing the effects of multipath fading attributable to multiple scattering in the transmission medium; and (b) an additive-noise term representing both receiver noise and, more significantly, co-channel interference which can be expected in a multi-user system. After reception and prefiltering, the received discrete response r[n] may be defined by the following mathematical expression:

$$r[n] = \sum_k a[n;k] y[n-k] + w[n]. \qquad \text{Equation (4)}$$

wherein y[n–k] represents the received version of the transmitted discrete signal; a[n;k] represents the "fading kernel" of the channel; and w[n] is a complex "white-Gaussian sequence" identified with additive noise from the channel.

After equalization, the response r[n] has been compensated so that it becomes a satisfactory estimated reproduction ŷ[n] of the signature-modulated discrete data stream just prior to conversion to analog form in the transmitter of the system. This estimated reproduction is represented by the following expression:

$$\hat{y}[n] = \sum_k b[n;k] r[n-k] \qquad \text{Equation (5)}$$

wherein b[n;k] represents the kernel of the linear time-varying filter of the equalizer and is typically a function of a[n;k] and of the additive noise which are characteristics of the channel. Both of those characteristics are measurable and assumed to be available at the receiver.

Next, $\hat{y}_m[n]$ goes to a signature demodulator/post-coder 41 which effectively "undoes" the precoding/signature-modulation step that occurred in the transmitter. Specifically, ŷ[n], the output of equalizer 35, is convolved in signature demodulator/postcoder 41 with the time-reversed replica of the appropriate signature sequence $h_m[-n]$. Then, the output of signature demodulator/postcoder 41 is downsampled at a rate "L," which is the same parameter by which the symbol stream $x_m[n]$ was upsampled in the transmitter. Thus, the downsampling in a bandwidth compressor 43 is essentially a bandwidth compression by the same factor that was applied in expanding the bandwidth in the transmitter. The signature demodulation/postcoding step may be summarized mathematically by the following expression:

$$\hat{x}_m[n] = \hat{y}[n] \ast h_m[-n] = \sum_k \hat{y}[k] h_m[k-n]. \qquad \text{Equation (6)}$$

Finally, the signature-demodulated stream $\hat{x}_m[n]$, following bandwidth compression, is decoded in an error-correction decoder 45 to produce an estimate $\hat{s}_m[n]$ of the desired message in a manner appropriate for whatever error-correction coding was applied at the transmitter. For example, if a form of convolutional coding was applied at the transmitter, a "Viterbi" decoder should generally be used at the receiver. However, if no coding against additive noise was employed at the transmitter, there is no need to include the final error-correction decoder in the receiver. A description of the Viterbi type of decoder is presented in the Proakis book between pages 454 and 459.

SUMMARY OF THE DISCLOSURE

The foregoing paragraphs have disclosed in detail a very efficient method and apparatus for coding, "precoding", transmitting, receiving, detecting, and recovering a stream of digital data. Of course, if the digital data were derived from an analog information source, that analog information can be reproduced with great accuracy by conversion of the estimated digital data stream reproduced by the receiver.

An important feature of the system in accordance with the invention is the use of a signature sequence with which the digital data stream is convolved in the process of preparation for transmission. The duration or length of the signature sequence should be greater than the inter-symbol time interval of the data stream being prepared for transmission. The length of the signature sequence may also be adjusted to be comparable to or greater than the "coherence time" of the channel over which the data are to be transmitted.

In comparison with a conventional code-division multiple-access system, the system in accordance with this invention is not more complicated in circuitry and does not require additional bandwidth. Accordingly, it represents a very attractive alternative to conventional CDMA.

The foregoing disclosure has described in detail the most-favored configuration and optimum method contemplated by the inventor. However, it is recognized that certain variations therein may be made by others without departing from the ambit of the invention. Accordingly, the scope of the invention is defined in the following claims.

What I claim and desire to secure by Letters Patent of the United States is as follows:

1. A method for communicating at least one stream of symbols, having a regular inter-symbol time interval, over at least one radio channel, characterized by fading, between a first station and a second station, said method comprising the steps of:

(a) generating at said first station a train of signature sequences each of which has a controllable duration longer than said inter-symbol time interval, (b) delaying signature sequences of said train to form a train of delayed signature sequences in which adjacent signature sequences overlap in time, (c) modulating said stream of symbols onto said train of delayed signature sequences, said modulating step including periodically determining instantaneous products of said symbols with corresponding values of said train of overlapping delayed signature sequences and summing said instantaneous products to develop a modulated signal in discrete form, (d) converting said modulated signal in discrete form into a first waveform, (e) transmitting said first waveform from said first station over at least one fading radio channel whereby said first waveform becomes distorted, (f) receiving said distorted first waveform at said second station, (g) detecting from said received distorted first waveform an imperfect reproduction of said modulated signal in discrete form, (h) equalizing said imperfect reproduction of said modulated signal in discrete form thereby substantially to restore said imperfect reproduction to correspondence with said modulated signal in discrete form as developed at said first station, and (i) demodulating said equalized reproduction of said modulated signal in discrete form to separate therefrom said overlapping delayed signature sequences, thereby reproducing said stream of symbols.

2. A method in accordance with claim 1 in which equalizing of said imperfect reproduction of said modulated signal in discrete form is applied by RAKE receiving and compensation.

3. A method in accordance with claim 1 in which said first station is a base station of a cellular telephone system.

4. A method in accordance with claim 1 in which said second station is one of a plurality of mobile stations of a cellular telephone system.

5. A method in accordance with claim 4 in which one distinct stream of symbols is identified with each respective one of said plurality of mobile stations.

6. A method in accordance with claim 4 in which one distinct train of signature sequences is generated for and identified with each respective one of said plurality of mobile stations.

7. A method in accordance with claim 1 in which said first station is one of a plurality of mobile stations of a cellular telephone system.

8. A method in accordance with claim 1 in which said second station is a base station of a cellular telephone system.

9. A method in accordance with claim 1 in which said modulating step is performed by convolution.

10. A method in accordance with claim 1 in which said equalizing step is performed by a linear time-varying filter.

11. A method for communicating at least one stream of symbols having a regular inter-symbol time interval over at least one radio channel, characterized by fading, between a first station and a second station, said method comprising the steps of:

(a) expanding at said first station said stream of symbols in the time domain to produce a time-expanded symbol stream characterized by an expanded inter-symbol time interval, (b) generating a train of signature sequences each of which has a controllable duration longer than said expanded inter-symbol time interval, (c) delaying signature sequences of said train to form a train of delayed signature sequences in which adjacent signature sequences overlap in time, (d) modulating said time-expanded symbol stream onto said train of delayed signature sequences, said modulating step including periodically determining instantaneous products of said symbols with corresponding values of said train of overlapping delayed signature sequences and summing said instantaneous products to develop a modulation signal in discrete form, (e) converting said modulated signal in discrete form into a waveform, (f) transmitting said waveform from said first station over at least one fading radio channel whereby said waveform becomes distorted, (g) receiving said distorted waveform at said second station, (h) detecting from said received distorted waveform an imperfect reproduction of said modulated signal in discrete form, (i) equalizing said imperfect reproduction of said modulated signal in discrete form whereby substantially to restore said imperfect reproduction to correspondence with said modulated signal in discrete form as developed at said first station, (j) demodulating said equalized reproduction of said modulated signal in discrete form to separate therefrom said overlapping delayed signature sequences, thereby reproducing said time-expanded symbol stream, and (k) compressing said time-expanded symbol stream in the time domain to reproduce said stream of symbols.

12. A method in accordance with claim 11 in which said modulating step is performed by convolution.

13. A method for communicating at least one series of data bits from a first station to a second station over at least one radio channel characterized by fading, said method comprising the steps of:

(a) coding at said first station said series of data bits against error introducible by said fading channel to provide a coded stream of symbols characterized by a regular inter-symbol time interval, (b) expanding said coded stream of symbols in the time domain to produce a time-expanded symbol stream in which adjacent symbols of said stream are separated by an expanded inter-symbol time interval, (c) generating a train of signature sequences each of which has a duration longer than said expanded inter-symbol time interval, (d) delaying signature sequences of said train to form a train of delayed signature sequences in which adjacent signature sequences overlap in time, (e) modulating said time-expanded symbol stream onto said train of delayed signature sequences, said modulating step including periodically determining instantaneous products of said symbols with corresponding values of said train of overlapping delayed signature sequences and summing said instantaneous products to develop a modulated signal in discrete form, (f) converting said modulated signal in discrete form into a waveform, (g) transmitting said waveform from said first station over at least one fading radio channel whereby said waveform becomes distorted, (h) receiving said distorted waveform at said second station, (i) detecting from said received distorted waveform an imperfect reproduction of said modulated signal in discrete form, (j) equalizing said imperfect reproduction of said modulated signal in discrete form whereby substantially to restore said imperfect reproduction to correspondence with said modulated signal in discrete form as developed at said first station, (k) demodulating said equalized reproduction of said modulated signal in discrete form to separate therefrom said overlapping delayed signature sequences, thereby reproducing said time-expanded symbol stream, (l) compressing said time-expanded symbol stream in the time domain to reproduce said stream of symbols, and (m) decoding said stream of symbols to correct errors remaining therein and to reconstitute said series of data bits.

14. A method in accordance with claim 13 in which said coding step is performed by trellis coding.

15. A method in accordance with claim 13 in which said coding step is performed by convolution.

16. A method in accordance with claim 13 in which said coding step is performed by block coding.

17. A method of communicating at least one series of data bits from a first station to a second station over at least one radio channel characterized by fading, said method comprising the steps of:

(a) coding at said first station said series of data bits against error introducible by said fading channel to provide a coded stream of symbols characterized by a regular inter-symbol time interval, (b) expanding said coded stream of symbols in the time domain to produce a time-expanded symbol stream in which adjacent symbols of said stream are separated by an expanded inter-symbol time interval, (c) generating a train of signature sequences each of which has a duration longer than said expanded inter-symbol time interval, (d) delaying signature sequences of said train to form a train of delayed signature sequences in which adjacent signature sequences overlap in time, (e) modulating said time-expanded symbol stream onto said train of delayed signature sequences, said modulating step including periodically determining instantaneous products of said symbols with corresponding values of said train of overlapping delayed signature sequences and summing said instantaneous products to develop a modulated signal in discrete form, (f) converting into analog form said modulated signal in discrete from, thereby providing a complex analog signal, (g) resolving said complex analog signal into an in-phase component and a quadrature component, (h) providing a carrier wave, (i) modulating said carrier wave with said in-phase component and said quadrature component to yield a modulated carrier wave, (j) transmitting said modulated carrier wave over said channel from said first station to said second station, whereby said modulated carrier wave becomes impaired by said channel, (k) receiving said impaired modulated carrier wave at said second station, (l) filtering said impaired modulated carrier wave substantially to eliminate therefrom noise outside the frequency band occupied by said in-phase component and said quadrature component, (m) deriving from said filtered wave a synchronizing wave having the frequency of said carrier wave, (n) mixing said synchronizing wave with said filtered wave to detect therefrom said in-phase component and said quadrature component in approximate form, (o) converting said in-phase component and said quadrature component in approximate form into the form of a complex-valued discrete sequence, (p) equalizing said complex-valued discrete sequence to bring it into substantial correspondence with said modulated signal in discrete form developed at said first station, (q) demodulating said equalized discrete sequence to separate therefrom said overlapping delayed signature sequences and reproduce said time-expanded symbol stream in approximate form, (r) compressing in the time domain said approximate time-expanded symbol stream to reproduce in approximate form said coded stream of symbols provided at said first station, and (s) decoding said approximate coded stream of symbols to correct errors remaining therein and to reconstitute said series of data bits.

18. A method in accordance with claim 17 in which said mixing step and said second converting step are performed by a correlator detector.

19. A method for communicating at least one stream of symbols having a regular inter-symbol time interval from a first station to a second station over at least one radio channel characterized by fading, said method comprising the steps of:

(a) generating at said first station a train of signature sequences each of which has a controllable duration longer than said inter-symbol time interval, (b) delaying signature sequences of said train to form a train of delayed signature sequences in which adjacent signature sequences overlap in time, (c) modulating said stream of symbols onto said train of delayed signature sequences, said modulating step including periodically determining instantaneous products of said symbols with corresponding values of said train of overlapping delayed signature sequences and summing said instantaneous products to develop a modulated signal in discrete form, (d) converting said modulated signal in discrete form into a first waveform, (e) transmitting said first waveform from said first station over at least one fading radio channel whereby said first waveform becomes impaired, (f) receiving said impaired first waveform at said second station as a second waveform, (g) filtering and equalizing said second waveform to reduce noise and the impairment attributable to said fading radio channel, thereby producing a substantial replica of said modulated signal in discrete form, and (h) demodulating said substantial replica to separate therefrom said overlapping delayed signature sequences, thereby reproducing said stream of symbols.

20. Apparatus for processing at a station a waveform impaired by transmission through at least one fading radio channel and received at said station in impaired form, said waveform being an analog representation of a modulated signal in discrete form developed by periodically determining instantaneous products of a stream of symbols with corresponding values of a train of overlapping delayed signature sequences and summing said instantaneous products, each of said overlapping delayed signature sequences having a duration greater than the inter-symbol time interval or said stream of symbols, said apparatus comprising:

(a) a bandpass filter for eliminating from said received waveform noise outside the frequency bandwidth of said modulated signal, (b) a correlator detector for separating said modulated signal from its carrier and for converting it to an impaired replica of said modulated signal in discrete form, (c) an equalizer for restoring said impaired replica of said modulated signal in discrete form, and (d) a demodulator for separating from said equalized replica in discrete form said overlapping delayed signature sequences, thereby reproducing said stream of symbols.

21. Apparatus in accordance with claim 20, further including means for compressing the frequency bandwidth of said stream of symbols to produce a compressed stream of symbols.

22. Apparatus in accordance with claim 21, further including a decoder for correcting errors remaining in said compressed stream of symbols to provide a corrected reproduced stream of symbols.

* * * * *